US012567796B2

(12) United States Patent
Liao et al.

(10) Patent No.: US 12,567,796 B2
(45) Date of Patent: Mar. 3, 2026

(54) MOTOR DRIVER AND MOTOR DRIVING SYSTEM

(71) Applicant: Siemens Aktiengesellschaft, Munich (DE)

(72) Inventors: Hua Liao, Beijing (CN); Jun Ping Zhang, Nanjing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 19/125,595

(22) PCT Filed: Oct. 31, 2022

(86) PCT No.: PCT/CN2022/128630
§ 371 (c)(1),
(2) Date: Apr. 29, 2025

(87) PCT Pub. No.: WO2024/092408
PCT Pub. Date: May 10, 2024

(65) Prior Publication Data
US 2026/0012083 A1      Jan. 8, 2026

(51) Int. Cl.
H02M 1/32       (2007.01)
H02M 1/00       (2007.01)
H02M 7/797      (2006.01)

(52) U.S. Cl.
CPC ........... H02M 1/32 (2013.01); H02M 1/0067 (2021.05); H02M 7/797 (2013.01)

(58) Field of Classification Search
None
See application file for complete search history.

(56) References Cited

U.S. PATENT DOCUMENTS 7,450,408 B2 * 11/2008 Tan ..................... H02M 1/4216
363/37
2011/0101897 A1    5/2011 Wei
(Continued)

FOREIGN PATENT DOCUMENTS

| CN | 101286726 A | 10/2008 |
| CN | 202085130 U | 12/2011 |

(Continued)

OTHER PUBLICATIONS

Search Report for International Application No. PCT/CN2022/128630, 8 pages, Dec. 1, 2023.

(Continued)

*Primary Examiner* — Rexford N Barnie
*Assistant Examiner* — Joel Barnett
(74) *Attorney, Agent, or Firm* — Slayden Grubert Beard PLLC

(57)               ABSTRACT

Some embodiments of the teachings herein include a motor driver with an input end connected to a three-phase power grid, an output end connected to a motor, a rectifying circuit, a DC link circuit; and an inverter circuit. The inverter circuit has three DC/AC conversion branch circuits connected in parallel between positive and negative output ends of the DC link circuit and each conversion branch circuits has six switching devices. The rectifying circuit comprises a rectifier bridge, a first half bridge, three switches, and an inductor. When the motor is operating in a braking regeneration mode, regenerated energy generated during braking of the motor is fed back to a power grid.

6 Claims, 3 Drawing Sheets

(56)                    References Cited

U.S. PATENT DOCUMENTS

| | | | |
|---|---|---|---|
| 2019/0229632 A1* | 7/2019 | Ishibashi ........... | H02M 3/33576 |
| 2021/0067052 A1* | 3/2021 | Hu ...................... | H02M 5/4585 |
| 2021/0126550 A1* | 4/2021 | Yenduri .............. | H02M 5/4585 |

FOREIGN PATENT DOCUMENTS

| | | |
|---|---|---|
| CN | 108242816 A | 7/2018 |
| JP | 2005324884 A | 6/1997 |

OTHER PUBLICATIONS

Liu, Yong et al:"A Chopper-Inverter Controllers for Electric Vehicles Propulsion", Journal of Guangdong Mechanical Institute, vol. 15, No. 2, p. 53-57, Jun. 30, 1997; ISSN:1007-7375.

* cited by examiner

MOTOR DRIVER AND MOTOR DRIVING SYSTEM

CROSS-REFERENCE TO RELATED APPLICATIONS

This application is a U.S. National Stage Application of International Application No. PCT/CN2022/128630 filed Oct. 31, 2022, which designates the United States of America, the contents of which are hereby incorporated by reference in their entirety.

TECHNICAL FIELD

The present disclosure relates to circuits. Various embodiments of the teachings herein include motor drivers and motor driving systems.

BACKGROUND

Variable frequency controllers (VFC) are used in the motor driving and servo fields. In most situations, capacitors are used as power supply decoupling devices in DC link circuits. In the process of motor braking, regenerated energy is applied to the capacitor of the DC link circuit, causing the DC voltage to rise. If the voltage continues to rise and exceeds the permitted operating voltage, it might damage the capacitor. Generally, a braking resistor dissipates regenerated energy, so as to prevent damage to components due to overvoltage, but this raises other problems such as heat dissipation and a large volume requirement.

FIG. 1 shows a topological structure of a motor driver 10 in the prior art. Ua, Ub, and Uc are three phases of a power grid. Two single-phase diode rectifier bridges are used at an input end. One branch from each rectifier bridge shares one power grid phase, so as to support a power supply input of 1 AC or 3 AC. An intelligent power module (IPM) is used in the DC/AC converter to achieve a compact design. A large braking resistor R1 is connected to the DC link via a power switch T7. If the DC voltage rises to a limit value, the power switch T7 will be activated, and R1 will dissipate the overvoltage. A freewheeling diode D9 is added to eliminate instantaneous overvoltage caused by stray inductance of the braking resistor R1.

Since the braking resistor R1 has to dissipate the regenerated energy of the motor, it typically has a relatively high power capacity and a large volume. Moreover, it is generally custom-made, and therefore quite expensive. Most importantly, the dissipated power produces high temperatures inside the resistor of up to several hundred degrees Celsius, and this presents a major challenge for the heat sinks and structural design of the system as a whole.

SUMMARY

This summary is not exhaustive. It is not intended to determine key or important parts of the present disclosure, or to define the scope thereof. Its purpose is merely to present certain concepts in simplified form, as a preamble to the more detailed description that follows. In view of the above, the present disclosure describes motor drivers useful for eliminating overvoltage damage.

For example, some embodiments include a motor driver (20), an input end of the motor driver (20) being connected to a three-phase power grid (Ua, Ub, Uc), an output end of the motor driver (20) being connected to a motor (M), and the motor driver (20) comprising: a rectifying circuit (210), a DC link circuit (220) and an inverter circuit (230), the inverter circuit (230) comprising first, second and third DC/AC conversion branch circuits (2301, 2302, 2303) connected in parallel between positive and negative output ends of the DC link circuit (220), each of the first, second and third DC/AC conversion branch circuits (2301, 2302, 2303) respectively comprising first and second, third and fourth, fifth and sixth switching devices (T1, T2, T3, T4, T5, T6), characterized in that the rectifying circuit (210) comprises a rectifier bridge (2101), a first half bridge (2102), a first switch (K1), a second switch (K2), a third switch (K3) and an inductor (L1); the rectifier bridge (2101) comprises a first bridge arm and a second bridge arm connected in parallel; the first bridge arm comprises a first diode (D1) and a second diode (D2) connected in series, the second bridge arm comprises a third diode (D3) and a fourth diode (D4) connected in series; the first half bridge (2102) comprises a ninth switching device (T9), a ninth freewheeling diode (D9), a tenth switching device (T10) and a tenth freewheeling diode (D10), wherein the ninth freewheeling diode (D9) is connected in reverse between a collector and an emitter of the ninth switching device (T9), the tenth freewheeling diode (D10) is connected in reverse between a collector and an emitter of the tenth switching device (T10), the collector of the ninth switching device (T9) is connected to a positive output end of the rectifier bridge (2101), the emitter of the ninth switching device (T9) is connected to the collector of the tenth switching device (T10), and the emitter of the tenth switching device (T10) is connected to a negative output end of the rectifier bridge (2101); the inductor (L1) is connected between a c-phase (Uc) of the three-phase power grid and a midpoint of the first half bridge (2102), the first switch (K1) is connected in parallel with the inductor (L1), the second switch (K2) is connected between an a-phase (Ua) of the three-phase power grid and a midpoint of the first bridge arm of the rectifier bridge (2101), and the third switch (K3) is connected between a b-phase (Ub) of the three-phase power grid and a midpoint of the second bridge arm of the rectifier bridge (2101); the DC link circuit (220) is connected between the rectifying circuit (210) and the inverter circuit (230), and the DC link circuit (220) comprises a capacitor (C1) and a second half bridge (2202); the second half bridge (2202) comprises a seventh switching device (T7), a seventh freewheeling diode (D7), an eighth switching device (T8) and an eighth freewheeling diode (D8); the seventh freewheeling diode (D7) is connected in reverse between a collector and an emitter of the seventh switching device (T7), and the eighth freewheeling diode (D8) is connected in reverse between a collector and an emitter of the eighth switching device (T8), wherein a first end and a second end of the capacitor (C1) are respectively connected to the positive output end and the negative output end of the rectifying circuit (210), the collector of the seventh switching device (T7) is connected to the first end of the capacitor (C1), the emitter of the seventh switching device (T7) is connected to the collector of the eighth switching device (T8), and the emitter of the eighth switching device (T8) is connected to the second end of the capacitor (C1).

In some embodiments, a midpoint of the seventh switching device (T7) and the eighth switching device (T8) is connected to a neutral point of the three-phase power grid; when the motor connected to the motor driver (20) is operating in a braking regeneration mode, regenerated energy generated during braking is fed to the c-phase of the power grid.

In some embodiments, the first to the tenth devices (T1, T2, T3, T4, T5, T6, T7, T8, T9, T10) are fully controlled power transistors.

In some embodiments, the fully controlled power transistors are insulated gate bipolar transistors.

As another example, some embodiments include a motor driver (30), an input end of the motor driver (30) being connected to a single-phase power grid (Ua), an output end of the motor driver (30) being connected to a motor (M), and the motor driver (30) comprising: a rectifying circuit (310), a DC link circuit (320) and an inverter circuit (330), the inverter circuit (330) comprising first, second and third DC/AC conversion branch circuits (2301, 2302, 2303) connected in parallel between positive and negative output ends of the DC link circuit (320), each of the first, second and third DC/AC conversion branch circuits (2301, 2302, 2303) respectively comprising first and second, third and fourth, fifth and sixth switching devices (T1, T2, T3, T4, T5, T6), characterized in that the rectifying circuit (310) comprises a rectifier bridge (3101), a first half bridge (3102), a first switch (K1), a second switch (K2) and an inductor (L1); the rectifier bridge (3101) comprises a first bridge arm and a second bridge arm connected in parallel; the first bridge arm comprises a first diode (D1) and a second diode (D2) connected in series, the second bridge arm comprises a third diode (D3) and a fourth diode (D4) connected in series; the first half bridge (3102) comprises a ninth switching device (T9), a ninth freewheeling diode (D9), a tenth switching device (T10) and a tenth freewheeling diode (D10); the ninth freewheeling diode (D9) is connected in reverse between a collector and an emitter of the ninth switching device (T9), the tenth freewheeling diode (D10) is connected in reverse between a collector and an emitter of the tenth switching device (T10), the collector of the ninth switching device (T9) is connected to a positive output end of the rectifier bridge (3101), the emitter of the ninth switching device (T9) is connected to the collector of the tenth switching device (T10), and the emitter of the tenth switching device (T10) is connected to a negative output end of the rectifier bridge (3101); the first switch (K1) and the inductor (L1) are connected in parallel; an input end of a parallel-connected circuit formed by the first switch (K1) and the inductor (L1) is connected to a neutral terminal of the single-phase power grid and a midpoint of the second bridge arm of the rectifier bridge (3101), and an output end of the parallel-connected circuit is connected to a midpoint of the first half bridge (3102); and the second switch (K2) is connected between an output end of the single-phase power grid and a midpoint of the first bridge arm of the rectifier bridge (3101); the DC link circuit (320) is connected between the rectifying circuit (310) and the inverter circuit (330), and the DC link circuit (320) comprises a capacitor (C1) and a second half bridge (3202); the second half bridge comprises a seventh switching device (T7), a seventh freewheeling diode (D7), an eighth switching device (T8) and an eighth freewheeling diode (D8); the seventh freewheeling diode (D7) is connected in reverse between a collector and an emitter of the seventh switching device (T7), and the eighth freewheeling diode (D8) is connected in reverse between a collector and an emitter of the eighth switching device (T8), wherein a first end and a second end of the capacitor (C1) are respectively connected to the positive output end and the negative output end of the rectifying circuit (310), the collector of the seventh switching device (T7) is connected to the first end of the capacitor (C1), the emitter of the seventh switching device (T7) is connected to the collector of the eighth switching device (T8), and the emitter of the eighth switching device (T8) is connected to the second end of the capacitor (C1); and a midpoint of the seventh switching device and the eighth switching device is connected to an a-phase input end of the second switch.

As another example, some embodiments include a motor driving system, comprising a motor driver as described herein and a motor, the motor driver being used to drive the motor, wherein when the motor is operating in a braking regeneration mode, regenerated energy generated during braking of the motor is fed back to a power grid.

BRIEF DESCRIPTION OF THE DRAWINGS

The above and other objectives, characteristics, and advantages of the teachings of the present disclosure are understood more easily with reference to the following description of example embodiments in conjunction with the drawings. The components in the drawings are merely intended to illustrate the principles of the present disclosure. In the drawings, identical or similar technical features or components are indicated with identical or similar reference signs. In the drawings.

KEY TO THE DRAWINGS

Figure 1:
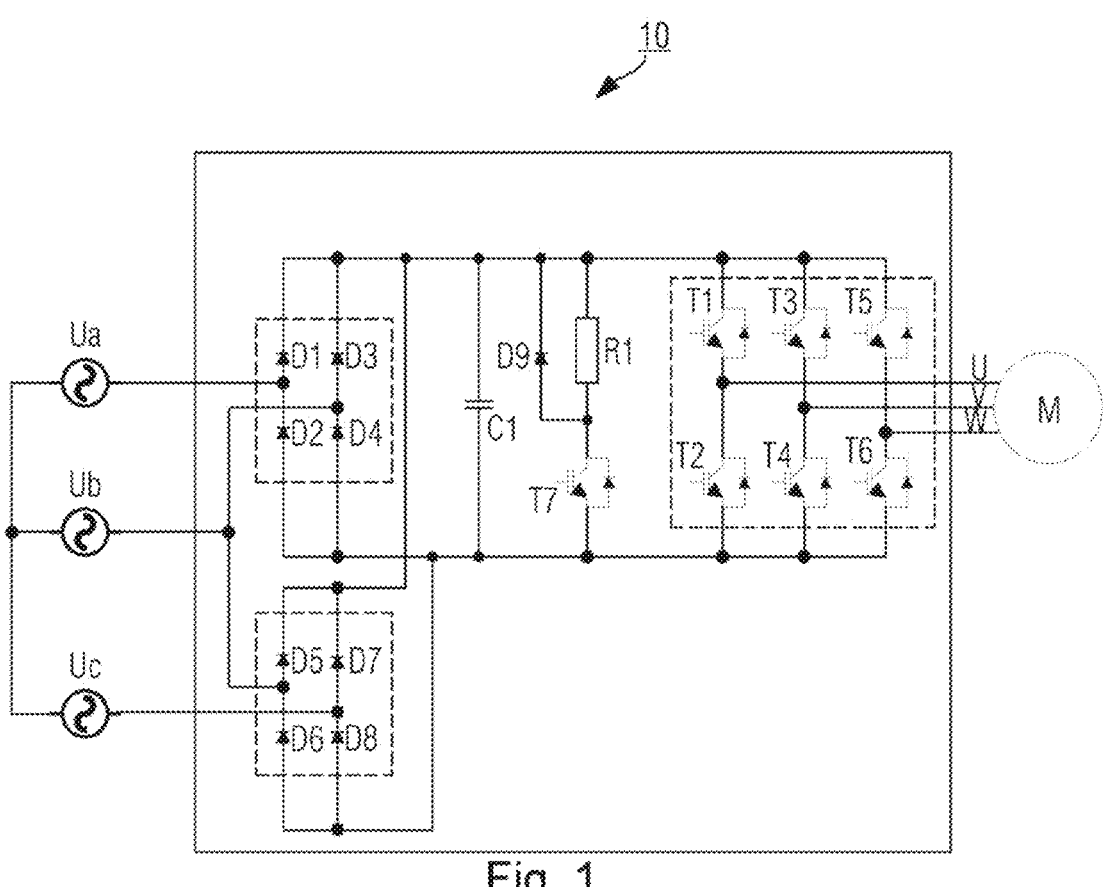
FIG. 1 is a circuit topology diagram of a motor driver in the prior art.

10, 20, 30: motor driver
D1-D10: diodes
T1-T10: first to tenth switching devices
220, 320: DC link circuit
M: motor
2102, 3102: first half bridge
L1: inductor
C1: capacitor
Ua, Ub and Uc: power grid
R1: resistor
210, 310: rectifying circuit
230, 330: inverter circuit
2101, 3101: rectifier bridge
2301, 2302, 2303: first to third DC/AC conversion branch circuits
2202, 3202: second half bridge
K1-K3: first to third switches

DETAILED DESCRIPTION

Some embodiments of the present disclosure include a motor driver, an input end of the motor driver being connected to a three-phase power grid, an output end of the motor driver being connected to a motor, and the motor driver comprising: a rectifying circuit, a DC link circuit and an inverter circuit, the inverter circuit comprising first, second and third DC/AC conversion branch circuits connected in parallel between positive and negative output ends of the DC link circuit, each of the first, second and third DC/AC conversion branch circuits respectively comprising first and second, third and fourth, fifth and sixth switching devices, wherein the rectifying circuit comprises a rectifier bridge, a first half bridge, a first switch, a second switch and an inductor; the rectifier bridge comprises a first bridge arm and a second bridge arm connected in parallel; the first bridge arm comprises a first diode and a second diode connected in series, the second bridge arm comprises a third diode and a fourth diode connected in series; the first half bridge comprises a ninth switching device, a ninth freewheeling diode, a tenth switching device and a tenth freewheeling diode, wherein the ninth freewheeling diode is connected in reverse between a collector and an emitter of the ninth switching device, the tenth freewheeling diode is connected in reverse between a collector and an emitter of the tenth switching device, the collector of the ninth switching device is connected to a positive output end of the rectifier bridge, the emitter of the ninth switching device is connected to the collector of the tenth switching device, and the emitter of the tenth switching device is connected to a negative output end of the rectifier bridge; the inductor is connected between a c-phase of the three-phase power grid and a midpoint of the first half bridge, the first switch is connected in parallel with the inductor, the second switch is connected between an a-phase of the three-phase power grid and a midpoint of the first bridge arm of the rectifier bridge, and the third switch is connected between a b-phase of the three-phase power grid and a midpoint of the second bridge arm of the rectifier bridge; and the DC link circuit is connected between the rectifying circuit and the inverter circuit, and the DC link circuit comprises a capacitor and a second half bridge; the second half bridge comprises a seventh switching device, a seventh freewheeling diode, an eighth switching device and an eighth freewheeling diode; the seventh freewheeling diode is connected in reverse between a collector and an emitter of the seventh switching device, and the eighth freewheeling diode is connected in reverse between a collector and an emitter of the eighth switching device, wherein a first end and a second end of the capacitor are respectively connected to the positive output end and the negative output end of the rectifying circuit, the collector of the seventh switching device is connected to the first end of the capacitor, the emitter of the seventh switching device is connected to the collector of the eighth switching device, and the emitter of the eighth switching device is connected to the second end of the capacitor. In this way, overvoltage damage to the capacitor can be avoided.

In some embodiments, a midpoint of the seventh switching device and the eighth switching device is connected to a neutral point of the three-phase power grid; and when the motor connected to the motor driver is operating in a braking regeneration mode, regenerated energy generated during braking is fed to the c-phase of the power grid. In this way, regenerated energy generated during braking can be fed back to the power grid, helping to save energy.

In some embodiments, the first to the ninth devices are fully controlled power transistors.

In some embodiments, the fully controlled power transistors are insulated gate bipolar transistors.

Some embodiments of the present disclosure include a motor driver, an input end of the motor driver being connected to a single-phase power grid, an output end of the motor driver being connected to a motor, and the motor driver comprising: a rectifying circuit, a DC link circuit and an inverter circuit, the inverter circuit comprising first, second and third DC/AC conversion branch circuits connected in parallel between positive and negative output ends of the DC link circuit, each of the first, second and third DC/AC conversion branch circuits respectively comprising first and second, third and fourth, fifth and sixth switching devices, wherein the rectifying circuit comprises a rectifier bridge, a first half bridge, a first switch, a second switch and an inductor; the rectifier bridge comprises a first bridge arm and a second bridge arm connected in parallel; the first bridge arm comprises a first diode and a second diode connected in series, the second bridge arm comprises a third diode and a fourth diode connected in series; the first half bridge comprises a ninth switching device, a ninth freewheeling diode, a tenth switching device and a tenth freewheeling diode; the ninth freewheeling diode is connected in reverse between a collector and an emitter of the ninth switching device, the tenth freewheeling diode is connected in reverse between a collector and an emitter of the tenth switching device, the collector of the ninth switching device is connected to a positive output end of the rectifier bridge, the emitter of the ninth switching device is connected to the collector of the tenth switching device, and the emitter of the tenth switching device a negative output end of the rectifier bridge; the first switch and the inductor are connected in parallel; an input end of a parallel-connected circuit formed by the first switch and the inductor is connected to a neutral input end of the single-phase power grid and a midpoint of the second bridge arm of the rectifier bridge, and an output end of the parallel-connected circuit is connected to a midpoint of the first half bridge; and the second switch is connected between an output end of the single-phase power grid and a midpoint of the first bridge arm of the rectifier bridge; and the DC link circuit is connected between the rectifying circuit and the inverter circuit, and the DC link circuit comprises a capacitor and a second half bridge; the second half bridge comprises a seventh switching device, a seventh freewheeling diode, an eighth switching device and an eighth freewheeling diode; the seventh freewheeling diode is connected in reverse between a collector and an emitter of the seventh switching device, and the eighth freewheeling diode is connected in reverse between a collector and an emitter of the eighth switching device, wherein a first end and a second end of the capacitor are respectively connected to the positive output end and the negative output end of the rectifying circuit, the collector of the seventh switching device is connected to the first end of the capacitor, the emitter of the seventh switching device is connected to the collector of the eighth switching device, and the emitter of the eighth switching device is connected to the second end of the capacitor; a midpoint of the seventh switching device and the eighth switching device is connected to an a-phase input end of the second switch.

Some embodiments of the present disclosure include a motor driving system comprising a motor driver as described herein and a motor, the motor driver being used to drive the motor, wherein, when the motor is operating in a braking regeneration mode, regenerated energy generated during braking of the motor is fed back to a power grid.

In the circuit topology of the motor drivers incorporating teachings of the present disclosure, the braking resistor generally used in the prior art is eliminated by adding two half bridge branches. The traditional braking resistor generally has a large volume, generates a large amount of heat, and has a high cost. Thus, the circuit topology of a motor driver incorporating teachings of the present disclosure may have at least one of the following technical advantages:

1. It facilitates the design of system cooling and can eliminate the effect of a braking resistor on other temperature-sensing components.
2. It saves volume: the braking resistor in the circuit topology of the prior art needs to dissipate regenerated energy and therefore has a very large volume, so eliminating the resistor in the circuit topology helps to save space.

3. In contrast to the expensive braking resistor, the added elements can be commercial elements, so costs can be reduced.

4. The regenerated energy generated during braking can be fed back to the power grid, helping to save energy.

The subject matter described herein is now discussed with reference to exemplary embodiments. It should be understood that the sole purpose of discussing these embodiments is to enable those skilled in the art to better understand and thereby implement the subject matter described herein, without limiting the protection scope, applicability, or examples expounded in the claims. Changes may be made to the functions and arrangement of the discussed elements without departing from the scope of protection of the content disclosed herein. Various processes or components may be omitted from, replaced in or added to various examples as required. For example, the described method may be performed in a different order to that described, and various steps may be added, omitted or combined. Furthermore, features described in relation to some examples may also be combined in other examples.

As used herein, the term "comprising" and variants thereof denote open terms meaning "including but not limited to". The term "based on" means "at least partly based on". The terms "one embodiment" and "an embodiment" mean "at least one embodiment". The term "another embodiment" means "at least one other embodiment". The terms "first", "second", etc. may denote different or identical objects. Other definitions may be included below, whether explicit or implicit. Unless clearly specified in the context, the definition of a term is the same throughout the description.

Figure 2:
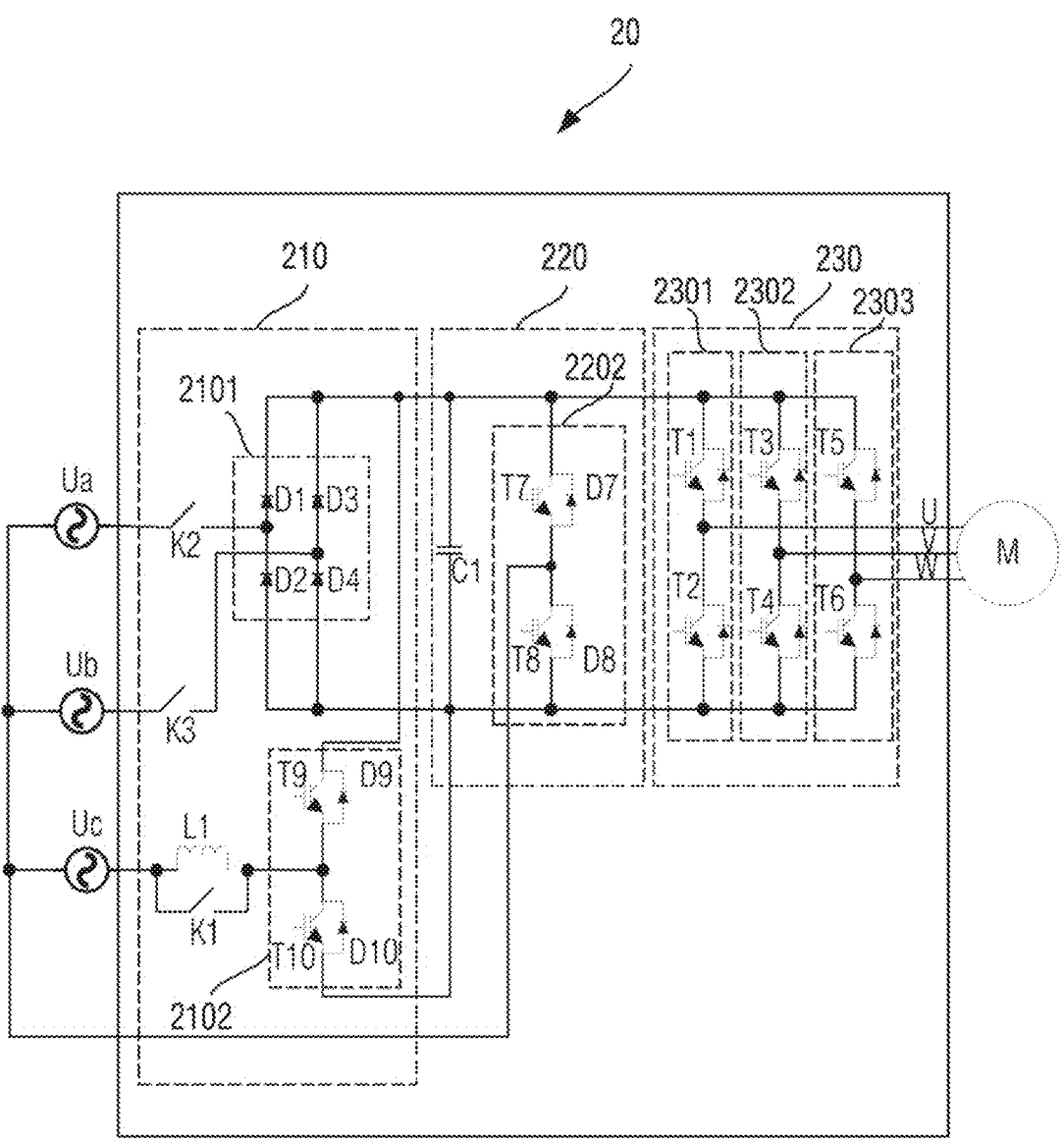
FIG. 2 is a circuit topology diagram of a motor driver incorporating teachings of the present disclosure.

FIG. 2 shows an exemplary circuit topology diagram of a motor driver 20 incorporating teachings of the present disclosure. As shown in FIG. 2, an input end of the motor driver 20 is connected to three phases Ua, Ub and Uc of a three-phase power grid, and an output end of the motor driver is connected to a motor M.

The motor driver 20 comprises a rectifying circuit 210, a DC link circuit 220 and an inverter circuit 230.

The rectifying circuit 210 comprises a rectifier bridge 2101, a first half bridge 2102, a first switch K1, a second switch K2, a third switch K3 and an inductor L1.

The rectifier bridge 2101 comprises a first bridge arm and a second bridge arm connected in parallel; the first bridge arm comprises a first diode D1 and a second diode D2 connected in series, and the second bridge arm comprises a third diode D3 and a fourth diode D4 connected in series. The first half bridge 2102 comprises a ninth switching device T9, a ninth freewheeling diode D9, a tenth switching device and a tenth freewheeling diode D10, wherein the ninth freewheeling diode D9 is connected in reverse between a collector and an emitter of the ninth switching device T9, the tenth freewheeling diode D10 is connected in reverse between a collector and an emitter of the tenth switching device T10, the collector of the ninth switching device T9 is connected to a positive output end of the rectifier bridge 2101, the emitter of the ninth switching device is connected to the collector of the tenth switching device, and the emitter of the tenth switching device T10 is connected to a negative output end of the rectifier bridge 2101.

The inductor L1 is connected between the c-phase Uc of the three-phase power grid and a midpoint of the first half bridge 2102 (i.e. the midpoint of connection of the ninth switching device T9 and the tenth switching device T10), the first switch K1 is connected in parallel with the inductor L1, the second switch K2 is connected between the a-phase Ua of the three-phase power grid and a midpoint of the first bridge arm of the rectifier bridge 2101, and the third switch K3 is connected between the b-phase Ub of the three-phase power grid and a midpoint of the second bridge arm of the rectifier bridge 2101.

The DC link circuit 220 is connected between the rectifying circuit 210 and the inverter circuit 230, for the purpose of filtering an output voltage of the rectifying circuit.

The DC link circuit 220 comprises a capacitor C1 and a second half bridge 2202. The second half bridge 2202 comprises a seventh switching device T7, a seventh freewheeling diode D7, an eighth switching device T8 and an eighth freewheeling diode D8; the seventh freewheeling diode D7 is connected in reverse between a collector and an emitter of the seventh switching device T7, and the eighth freewheeling diode D8 is connected in reverse between a collector and an emitter of the eighth switching device T8, wherein a first end and a second end of the capacitor C1 are respectively connected to the positive output end and the negative output end of the rectifying circuit 210, the collector of the seventh switching device T7 is connected to the first end of the capacitor C1, the emitter of the seventh switching device is connected to the collector of the eighth switching device, and the emitter of the eighth switching device T8 is connected to the second end of the capacitor C1.

It can be seen that the first half bridge 2102 and the second half bridge 2202 have identical circuit topology structures.

The inverter circuit 230 is connected to the DC link circuit 220, and comprises three (first, second and third) DC/AC (direct current/alternating current) conversion branch circuits connected in parallel, for converting a DC voltage outputted by the DC link circuit to an AC voltage.

Specifically, the inverter circuit 230 comprises first, second and third DC/AC conversion branch circuits 2301, 2302, 2303, which are connected in parallel between positive and negative output ends of the DC link circuit 220. Each of the first, second and third DC/AC conversion branch circuits 2301, 2302, 2303 respectively comprises first and second, third and fourth, fifth and sixth switching devices T1, T2, T3, T4, T5, T6.

The topological structure of the inverter circuit shown in FIG. 2 is a circuit that is typically used in the prior art, but the inverter circuit part of the present disclosure need not be limited to what is shown in FIG. 2; other topologies may also be used, but these are not described in detail here.

In some embodiments, the single fully controlled power transistor may be composed of multiple fully controlled power transistors connected in parallel, in series, or in a hybrid manner. Similarly, the single diode may also be composed of multiple diodes connected in parallel, in series, or in a hybrid manner. In the present disclosure, the fully controlled power transistor is for example an insulated gate bipolar transistor (IGBT). Those skilled in the art will understand that other types of power transistors may also be used, but these are not described in further detail here.

In a normal operating state, the first switch K1, the second switch K2 and the third switch K3 of the motor driver 20 are all closed, and the seventh switching device T7, the eighth switching device T8, the ninth switching device T9 and the tenth switching device T10 are not activated; in this case, the inductor L1 is bypassed. The rectifier bridge together with the ninth freewheeling diode D9 and the tenth freewheeling diode D10 can serve as a three-phase rectifier bridge.

When the DC link voltage rises to a protection value, a braking function is activated. At this time, the DC link voltage is greater than a power grid voltage peak value, so the rectifier bridge 2101 is blocked. When the motor is operating in a braking regeneration mode, the first switch K1, the second switch K2 and the third switch K3 are opened simultaneously, the seventh switching device T7, the eighth switching device T8, the ninth switching device T9 and the tenth switching device T10 are activated, and may be regarded as an H bridge converter, which can reduce the DC voltage.

It can be seen from FIG. 2 that the midpoint of the seventh switching device T7 and the eighth switching device T8 is connected to a neutral point of the three-phase power grid; in this case, DC link energy (i.e. regenerated energy generated during braking) can be fed via the inductor L1 to the c-phase Uc of the power grid, and regenerated energy can thus be utilized effectively. Furthermore, the current being fed can be controlled so as to be a sine wave, in order to avoid injection of harmonics into the power grid.

Figure 3:
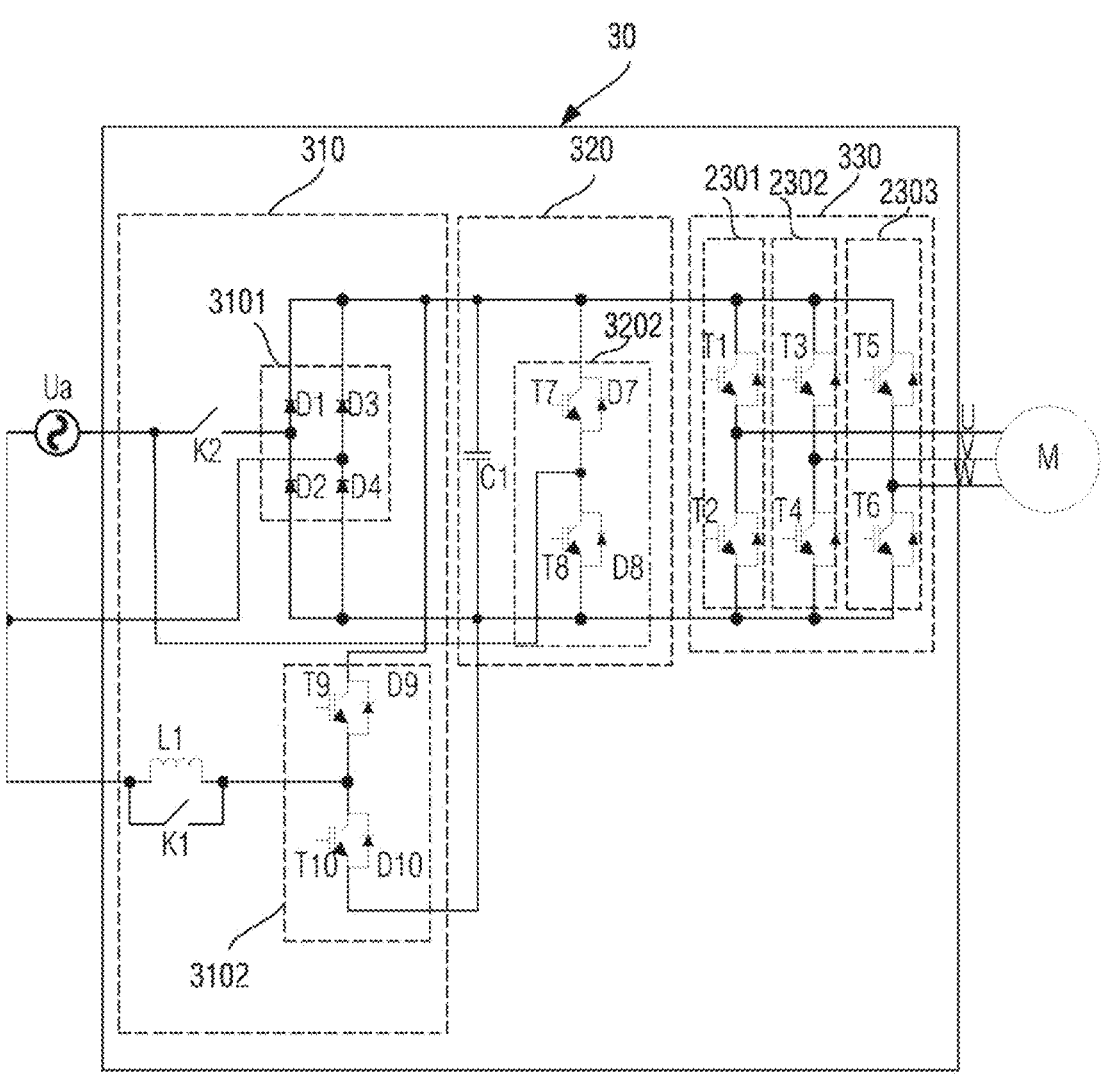
FIG. 3 is a circuit topology diagram of a motor driver incorporating teachings of the present disclosure.

FIG. 3 shows an exemplary circuit topology diagram of a motor driver 30 incorporating teachings of the present disclosure. As shown in FIG. 3, an input end of the motor driver 30 is connected to a single-phase power grid Ua, and an output end of the motor driver is connected to a motor M.

The motor driver 30 comprises a rectifying circuit 310, a DC link circuit 320 and an inverter circuit 330.

The circuit topologies of the DC link circuit 320 and the inverter circuit 330 are essentially the same as the circuit topologies of the DC link circuit 220 and the inverter circuit 230 in the motor driver 20 shown in FIG. 2, so are not described again here.

The rectifying circuit 310 in FIG. 3 is connected to a single-phase power grid, so has a circuit topology that differs somewhat from that of the rectifying circuit 210 shown in FIG. 2.

Specifically, the rectifying circuit 310 comprises a rectifier bridge 3101, a first half bridge 3102, a first switch K1, a second switch K2 and an inductor L1. The circuit topologies of the rectifier bridge 3101 and the first half bridge 3102 are the same as the circuit topologies of the rectifier bridge 2101 and the first half bridge 2102, so are not described in detail again here.

In the rectifying circuit 310, the first switch K1 and the inductor L1 are connected in parallel; an input end of a parallel-connected circuit formed by the first switch K1 and the inductor L1 is connected to a neutral terminal of the single-phase power grid Ua and a midpoint of a second bridge arm of the rectifier bridge 3101, and an output end of the parallel-connected circuit is connected to a midpoint of the first half bridge 3102; and the second switch K2 is connected between an output end of the single-phase power grid Ua and a midpoint of a first bridge arm of the rectifier bridge 3101.

The midpoint of the seventh switching device T7 and the eighth switching device T8 is connected to an a-phase input end of the second switch K2.

In a normal operating state, the first switch K1 and the second switch K2 are both closed, and the seventh switching device T7, the eighth switching device T8, the ninth switching device T9 and the tenth switching device T10 are not activated; in this case, the inductor L1 is bypassed. The rectifier bridge converts AC electrical energy of the single-phase power grid to DC electrical energy and supplies same to the DC link circuit 320.

When the motor is operating in a braking regeneration mode, the first switch K1 and the second switch K2 are opened simultaneously, the seventh switching device T7, the eighth switching device T8, the ninth switching device T9 and the tenth switching device T10 are activated, and may be regarded as an H bridge converter, so the DC voltage can be reduced. Furthermore, in this case, regenerated energy generated during braking can be fed via the inductor L1 to Ua of the single-phase power grid.

The braking resistor generally used in the prior art is eliminated by adding two half bridge branches; this braking resistor generally has a large volume, generates a large amount of heat, and has a high cost. Thus, the circuit topology of the motor driver may have at least one of the following technical advantages:

1. It facilitates the design of system cooling and can eliminate the effect of a braking resistor on other temperature-sensing components.
2. It saves volume: the braking resistor in the circuit topology of the prior art needs to dissipate regenerated energy and therefore has a very large volume, so eliminating the resistor in the circuit topology of the present invention helps to save space.
3. In contrast to the expensive braking resistor, the added elements can be commercial elements, so costs can be reduced.
4. The regenerated energy generated during braking can be fed back to the power grid, helping to save energy.

The specific embodiments expounded above with reference to the drawings describe exemplary embodiments, but do not represent all embodiments that can be realized or that fall within the scope of protection of the claims. The term "exemplary" used throughout this Description means "serving as an example, instance or illustration", and does not mean "preferred" or "advantageous" compared to other embodiments. In order to provide an understanding of the technologies described, specific embodiments include specific details. However, these technologies may be implemented in the absence of these specific details. In some instances, to avoid making the concepts of the described embodiments difficult to understand, well known structures and apparatuses are shown in the form of block diagrams.

The above description of the content of the present disclosure is provided to enable any person skilled in the art to realize or use the content of the present disclosure. To a person skilled in the art, various modifications to the content of the present disclosure will be obvious, and the general principles defined herein may be applied to other variants without departing from the scope of protection of the content of the present disclosure. Thus, the content of the present disclosure is not limited to the examples and designs described herein but is consistent with the broadest scope conforming to the principles and novel features disclosed herein. Any modifications, equivalent substitutions or improvements, etc. made within the spirit and principles of the present disclosure should be included in the scope of protection thereof.

What is claimed is:

1. A motor driver comprising:
    an input end connected to a IT three-phase power grid;
    an output end connected to a motor;
    a rectifying circuit;
    a DC link circuit; and
    an inverter circuit comprising first, second and third DC/AC conversion branch circuits connected in parallel between positive and negative output ends of the DC link circuit, each of the first, second and third DC/AC conversion branch circuits respectively comprising six switching devices;
    wherein the rectifying circuit comprises a rectifier bridge, a first half bridge, three switches, and an inductor;

the rectifier bridge comprises two bridge arms connected in parallel;

the first bridge arm comprises a first diode and a second diode connected in series and the second bridge arm comprises a third diode and a fourth diode connected in series;

the first half bridge comprises a ninth switching device, a ninth freewheeling diode, a tenth switching device, and a tenth freewheeling diode, wherein the ninth freewheeling diode is connected in reverse between a collector and an emitter of the ninth switching device, the tenth freewheeling diode is connected in reverse between a collector and an emitter of the tenth switching device, the collector of the ninth switching device is connected to a positive output end of the rectifier bridge, the emitter of the ninth switching device is connected to the collector of the tenth switching device, and the emitter of the tenth switching device is connected to a negative output end of the rectifier bridge;

the inductor is connected between a c-phase of the three-phase power grid and a midpoint of the first half bridge, the first switch is connected in parallel with the inductor the second switch is connected between an a-phase of the three-phase power grid and a midpoint of the first bridge arm of the rectifier bridge, and the third switch is connected between a b-phase of the three-phase power grid and a midpoint of the second bridge arm of the rectifier bridge;

the DC link circuit is connected between the rectifying circuit and the inverter circuit, and the DC link circuit comprises a capacitor and a second half bridge with a seventh switching device, a seventh freewheeling diode, an eighth switching device and an eighth freewheeling diode; and the seventh freewheeling diode is connected in reverse between a collector and an emitter of the seventh switching device, and the eighth freewheeling diode is connected in reverse between a collector and an emitter of the eighth switching device, wherein a first end and a second end of the capacitor are respectively connected to the positive output end and the negative output end of the rectifying circuit, the collector of the seventh switching device is connected to the first end of the capacitor, the emitter of the seventh switching device is connected to the collector of the eighth switching device, and the emitter of the eighth switching device is connected to the second end of the capacitor.

2. The motor driver as claimed in claim 1, wherein:

a midpoint of the seventh switching device and the eighth switching device is connected to a neutral point of the three-phase power grid; and when the motor connected to the motor driver operates in a braking regeneration mode, regenerated energy generated during braking is fed to the c-phase of the power grid.

3. The motor driver as claimed in claim 1, wherein the first to the tenth devices each comprise a fully controlled power transistor.

4. The motor driver as claimed in claim 3, wherein each fully controlled power transistors comprises an insulated gate bipolar transistors.

5. A motor driver comprising:

an input end connected to a single-phase power grid;

an output end of the motor driver connected to a motor;

a rectifying circuit;

a DC link circuit; and an inverter circuit comprising first, second and third DC/AC conversion branch circuits connected in parallel between positive and negative output ends of the DC link circuit, each of the first, second and third DC/AC conversion branch circuits respectively comprising two switching devices;

wherein the rectifying circuit comprises a rectifier bridge, a first half bridge, a first switch, a second switch, and an inductor;

the rectifier bridge comprises a first bridge arm and a second bridge arm connected in parallel;

the first bridge arm comprises a first diode and a second diode connected in series, the second bridge arm comprises a third diode and a fourth diode connected in series;

the first half bridge comprises a ninth switching device, a ninth freewheeling diode, a tenth switching device, and a tenth freewheeling diode;

the ninth freewheeling diode is connected in reverse between a collector and an emitter of the ninth switching device, the tenth freewheeling diode is connected in reverse between a collector and an emitter of the tenth switching device, the collector of the ninth switching device is connected to a positive output end of the rectifier bridge, the emitter of the ninth switching device is connected to the collector of the tenth switching device, and the emitter of the tenth switching device is connected to a negative output end of the rectifier bridge;

the first switch and the inductor are connected in parallel;

an input end of a parallel-connected circuit formed by the first switch and the inductor is connected to a neutral terminal of the single-phase power grid and a midpoint of the second bridge arm of the rectifier bridge, and an output end of the parallel-connected circuit is connected to a midpoint of the first half bridge;

the second switch is connected between an output end of the single-phase power grid and a midpoint of the first bridge arm of the rectifier bridge;

the DC link circuit is connected between the rectifying circuit and the inverter circuit, and the DC link circuit comprises a capacitor and a second half bridge;

the second half bridge comprises a seventh switching device, a seventh freewheeling diode, an eighth switching device, and an eighth freewheeling diode;

the seventh freewheeling diode is connected in reverse between a collector and an emitter of the seventh switching device, and the eighth freewheeling diode is connected in reverse between a collector and an emitter of the eighth switching device, wherein a first end and a second end of the capacitor are respectively connected to the positive output end and the negative output end of the rectifying circuit, the collector of the seventh switching device is connected to the first end of the capacitor, the emitter of the seventh switching device is connected to the collector of the eighth switching device, and the emitter of the eighth switching device is connected to the second end of the capacitor; and a midpoint of the seventh switching device and the eighth switching device is connected to an a-phase input end of the second switch.

6. A motor driving system comprising:

a motor; and a motor driver including: an input end connected to a three-phase power grid and an output end connected to a motor, a rectifying circuit, a DC link circuit, and an inverter circuit;

wherein the inverter circuit includes first, second and third DC/AC conversion branch circuits connected in parallel between positive and negative output ends of the DC link circuit, each of the first, second and third DC/AC conversion branch circuits respectively comprising six switching devices;

the rectifying circuit comprises a rectifier bridge, a first half bridge, three switches, and an inductor;

the rectifier bridge comprises two bridge arms connected in parallel;

the first bridge arm comprises a first diode and a second diode connected in series and the second bridge arm comprises a third diode and a fourth diode connected in series;

the first half bridge comprises a ninth switching device, a ninth freewheeling diode, a tenth switching device, and a tenth freewheeling diode, wherein the ninth freewheeling diode is connected in reverse between a collector and an emitter of the ninth switching device, the tenth freewheeling diode is connected in reverse between a collector and an emitter of the tenth switching device, the collector of the ninth switching device is connected to a positive output end of the rectifier bridge, the emitter of the ninth switching device is connected to the collector of the tenth switching device, and the emitter of the tenth switching device is connected to a negative output end of the rectifier bridge;

the inductor is connected between a c-phase of the three-phase power grid and a midpoint of the first half bridge, the first switch is connected in parallel with the inductor, the second switch is connected between an a-phase of the three-phase power grid and a midpoint of the first bridge arm of the rectifier bridge, and the third switch is connected between a b-phase of the three-phase power grid and a midpoint of the second bridge arm of the rectifier bridge;

the DC link circuit is connected between the rectifying circuit and the inverter circuit, and the DC link circuit comprises a capacitor and a second half bridge with a seventh switching device, a seventh freewheeling diode, an eighth switching device and an eighth freewheeling diode; and the seventh freewheeling diode is connected in reverse between a collector and an emitter of the seventh switching device, and the eighth freewheeling diode is connected in reverse between collector and an emitter of the eighth switching device, wherein a first end and a second end of the capacitor are respectively connected to the positive output end and the negative output end of the rectifying circuit, the collector of the seventh switching device is connected to the first end of the capacitor, the emitter of the seventh switching device is connected to the collector of the eighth switching device, and the emitter of the eighth switching device is connected to the second end of the capacitor; and when the motor is operating in a braking regeneration mode, regenerated energy generated during braking of the motor is fed back to a power grid.

\*   \*   \*   \*   \*